US006353529B1

United States Patent
Cies (10) Patent No.: US 6,353,529 B1
(45) Date of Patent: Mar. 5, 2002

(54) Z-CONFIGURATION STRUCTURE FOR COMPUTERS, SCANNERS, AND COMMUNICATIONS AND VIDEO DEVICES

(76) Inventor: Thomas Cies, 3 Hartford, Laguna Niguel, CA (US) 92677

( * ) Notice: Subject to any disclaimer, the term of this patent is extended or adjusted under 35 U.S.C. 154(b) by 0 days.

(21) Appl. No.: 09/437,494

(22) Filed: Nov. 10, 1999

Related U.S. Application Data (60) Provisional application No. 60/108,381, filed on Nov. 12, 1998.

(51) Int. Cl.[7] .............................. H05K 7/16; H05K 7/20
(52) U.S. Cl. ....................... 361/681; 361/683; 361/687; 248/917; 40/530
(58) Field of Search ........................ 361/687, 681–683; 348/794; 345/905; 248/917; 40/530

(56) References Cited

U.S. PATENT DOCUMENTS

| | | | | |
|---|---|---|---|---|
| 4,832,419 A | * | 5/1989 | Mitchell et al. | 312/7.2 |
| 4,859,092 A | * | 8/1989 | Makita | 400/83 |
| 5,229,757 A | * | 7/1993 | Takamiya et al. | 340/711 |
| 5,379,201 A | * | 1/1995 | Friedman | 362/191 |
| 5,383,138 A | * | 1/1995 | Motoyama et al. | 364/708.1 |
| 5,494,447 A | * | 2/1996 | Zaidan | 439/31 |
| 5,552,957 A | * | 9/1996 | Brown et al. | 361/683 |
| 5,615,945 A | * | 4/1997 | Tseng | 362/226 |
| 5,729,429 A | * | 3/1998 | Margaritis et al. | 361/680 |
| 5,868,487 A | * | 2/1999 | Polley et al. | 362/33 |
| 5,953,052 A | * | 9/1999 | McNelley et al. | 348/20 |
| 6,161,944 A | * | 12/2000 | Leman | 362/276 |

FOREIGN PATENT DOCUMENTS

| | | | | | |
|---|---|---|---|---|---|
| JP | 5-257568 A | * | 10/1993 | | G06F/1/16 |
| JP | 6-35567 A | * | 2/1994 | | G06F/1/16 |
| JP | 6-83479 A | * | 3/1994 | | G06F/1/16 |
| JP | 8-54962 A | * | 2/1996 | | G06F/1/16 |

* cited by examiner

*Primary Examiner*—Leo P. Picard
*Assistant Examiner*—Anatoly Vortman
(74) *Attorney, Agent, or Firm*—Jacques M. Dulin, Esq.; Innovation Law Group, Ltd.

(57) ABSTRACT

A multiply pivoted folding computer housing structure is disclosed which may be deployed in a generally Z-shaped configuration ("Z-computer") applicable to portable computers as well as other computer-user interface systems such as laptop, notebook and desktop personal computers, checkout scanners, video and communication devices such as cell phones, TV and digital video players. The preferred embodiment of the Z-computer of the invention comprises at least three separate panels: a low profile keyboard base panel which supports at its back end an upright CPU panel, which in turn supports at its upper edge an elevated flat panel display. These panels are interconnected by two hinge systems and are adjustably securable by means of a lock mechanism to an improved ergonomic deployed configuration with the display at a better viewing angle. The preferred embodiment also includes a novel internal overhead keyboard illumination system, optional stabilizer legs and improved convective and radiative cooling.

32 Claims, 4 Drawing Sheets

Z-CONFIGURATION STRUCTURE FOR COMPUTERS, SCANNERS, AND COMMUNICATIONS AND VIDEO DEVICES

RELATED APPLICATION

This application claims the priority of U.S. Provisional patent application No. 60/108,381, filed Nov. 12, 1998 by the same inventor, pursuant to 35 USC §119.

TECHNICAL FIELD

The Z-configuration folding computer system of the invention (herein generally referred to as "Z-computer") relates to computers, computer configurations and computer-user interfaces, and more particularly to structures, mechanical design, and illumination for display devices, notably laptop, notebook and desktop personal computers, checkout scanners, video and communication devices such as cell phones, TV and digital video players. The preferred embodiment of the Z-computer of the invention comprises a novel "Z" shaped deployment configuration including three separate panels: a low profile keyboard base panel which supports at its back end an upright CPU panel, which in turn supports at its upper edge an elevated flat panel display. These panels are interconnected by two hinge systems and are adjustably securable by means of a lock mechanism to an improved ergonomic deployed configuration with the display at a better viewing angle. The preferred embodiment also includes a novel internal overhead keyboard illumination system, optional stabilizer legs and improved convective and radiative cooling.

BACKGROUND

Conventional notebook and laptop computers offer constrained, limited, but familiar configuration: a low display hinged to a relatively thick CPU box on which keys are superimposed, with a flat panel-type display hinged to the rear portion of the CPU/Keyboard. All users, whether part time, full time or professional; from word-processors to graphics-designers, await a notebook configuration that is more comfortable, physiologically safer, (ergonomic) and more accurate (with respect to both display clarity and point-click interface).

It is apparent that the ever more demanding activity that is being done on notebooks requires a new integrated notebook interface. Furthermore, the conventional laptop/notebook computer has a very limited available range of display adjustment, given that the display is hinged at a fixed axis to the rear of the keyboard/CPU.

In particular, the display is farther from the user's eyes than is optimum for visual resolution and comfort and cannot be raised above keyboard level. In addition, existing laptop/notebook computers have display mountings with are inconvenient and difficult to use in many environments, such as in an aircraft-type seating environment. Typically the display panel cannot be adjusted to a position which permits support and computer display clearance on a aircraft-type fold-down seatback tray while still providing a comfortable viewing profile and compatible hand-access to the keyboard.

What is needed, and is not available in the prior art, is a laptop/notebook computer system which provides a structure, mechanism and configuration with an elevated, highly adjustable display position.

SUMMARY AND OBJECTS OF THE INVENTION

It is an object of the invention to provide a redesign of the personal computer interface, in both desktop and portable (notebook/laptop) embodiments, for ease of use, comfort, safety, efficiency, and accuracy. It is a further object to create an ergonomic mechanism and configuration to minimize fatigue and physical damage, i.e., which mitigates strain and trauma to the neck, back, wrists, and eyes and which makes interaction more accurate, manually and visually, and thereby improve productivity. It is another object of the invention to provide a computer configuration which presents an adjustable display screen at an elevated position closer to the users eyes. By providing a display position closer to the eyes in the Z configuration of the invention, the apparent or equivalent size of the display is greatly increased as compared to conventional display configurations. This increase is on the order of 60–80% larger, e.g., a 14"–15" diagonal screen closer to the user has an apparent size equivalent to a 20–21" screen to normal position of present day computers.

The Z-configuration folding computer system of the invention (Z-computer) is an advanced integrated personal computer system and is preferably embodied as a mobile or portable personal computer, such as a laptop or notebook computer. The Z-computer configuration is equally advantageous as embodied in a dedicated desktop personal computer system, both for light duty systems and for high capability workstation systems.

The Z-configuration folding computer system of the invention is also useful in other types of personal data-interface systems, such as palmtop computers, personal digital assistant (PDA), video (TV, DVD players), communication devices, cell-phones, internet-capable devices, and the like.

The highly adjustable and functionally flexible Z-computer configuration also is well suited to a wide variety of other data processing user interface systems, including, for example, industrial, scientific and commercial application-oriented computer systems for mobile, field and fixed-base operation. Such data processing user interfaces may include specialized or application-oriented components and I/O devices, such as checkout or "point-of-sale" scanners, product ID code scanners, process controllers, credit-card readers, customer pin-code input pads, computer vision sensors, and the like. Manual-mechanical-video feedback controls may be included, such as in a user control station for remote scientific or industrial operations.

In this context, the term "data-processing user interface system" broadly includes laptop, notebook, palmtop, desktop and workstation-type personal computers, and also includes personal data-interface systems and industrial, scientific and commercial application-oriented systems as noted above, wherein the inclusion of the Z-computer type adjustable multi-pivoted, elevated-display structural configuration of the invention adds value and user functionality.

The preferred embodiment of the Z-computer comprises a "triad" of three (or optionally more than three) major sub-components together forming a computer system hinged together: The keyboard; the CPU; and the flat panel display. In a conventional laptop, the CPU/keyboard and display are configured as two panels connected by a single "clamshell" hinge. In the preferred Z-computer these elements comprise three separate panels connected by two hinges, which are deployed from an interleaved folded stowage configuration to a roughly "Z-shaped" deployed configuration. The "Z" shape description is used here loosely, however, as the upper limb (display panel) of the "Z" is typically not deployed close to horizontal, as described below.

The base or keyboard panel supports the Z-computer upon a desk, tabletop, folding tray, user lap or other support surface. The base or keyboard panel preferably includes at least one conventional manual user input device. Most typically, the manual user input device will comprise a conventional computer keyboard module. It may also include a conventional built-in pointing device, such as a track-ball, toggle pointer, or touch sensitive pad. The "keyboard" panel may also include or substitute other types of manual user input devices for particular applications of the Z-computer, such as a CAD drawing-board type input device, a stylus type input device, a product ID code scanner, manual-mechanical manipulators and controllers, and the like. The base or keyboard panel is preferably tapered upwardly from the front edge towards the back edge, so as to be ergonomically shaped to provide a smooth transition for the user's hands and wrists from tabletop to keyboard.

The second or intermediate panel preferably includes the CPU, motherboard (system board), power supply and associated components and is hinged to the rear edge of the keyboard panel. This intermediate panel will generally be referred to herein as "CPU panel" or "CPU", although the Z-computer of the invention includes mounting the CPU, motherboard, power supply and associated components in various combinations within any of the other three panels as the space geometry permits.

The placement of the CPU and other components in the intermediate panel, rather than in the keyboard panel as in conventional laptops, makes the preferred tapering of the keyboard structurally convenient by reducing the required internal volume of the keyboard panel. The intermediate or CPU panel of the preferred embodiment of the Z-computer is hinged adjacent the rear edge of the keyboard panel, and deployed at a generally upwardly directed angle extending above the keyboard panel. Typically the CPU panel is deployed extending upwardly over the keyboard panel and inclined towards the keyboard panel front edge so as to place the center of gravity of the CPU panel over the keyboard or base panel in a stabilized position with respect to the support surface or desktop. Typical included angles between the keyboard and the CPU panels are in the range of from about 45° to about 60°, although the user may adjust to individual preference to suit convenient viewing and keyboard operation.

The upper or display panel comprises the flat panel display, and this panel is hinged adjacent the upper edge of the CPU panel. The display panel is preferably stored folding inward interleaved between the keyboard and CPU panels. The display panel is preferably deployed at a generally upwardly directed angle, so that it lies either nearly vertically or at a slightly over-vertical angle tilted backwards away from the user, and angled so that the screen faces upward towards the user's face. Typical angles of the display panel are from about vertical to about a 30° angle backwards from vertical, although the user may adjust to individual preference to suit convenient viewing. Special operating conditions, such as a standing user, may be accommodated by selecting from a substantially greater range of adjustment angles for the CPU panel and/or the display panel, than are typically for a seated-user desktop deployment.

Each of the three or more panels (base, intermediate and display panel) comprises a structural housing in or on which a plurality of components may be mounted. In general the term "panel" as used herein will include the panel housing and its mounted components.

A plurality of conventional computer components, component mountings, input/output devices, electrical interconnectors (including wiring, connector pairs, board sockets, buses, and the like to provide functional connections between components), printing devices, and other devices which are conventionally included in computers and computer-type systems may be selectively included and mounted in any of the three panels. For special-purpose embodiments of the Z-computer, application-oriented devices such as credit card readers, video/microphone inputs, beam-type display projectors, scanners for product ID, sensors for machine vision, process control sensors, and the like, may be included.

Preferably, a majority of the volume filling and heat generating components are mounted within the intermediate or CPU panel. Optionally, heavier or denser components may be mounted in the base panel or in the lower portion of the intermediate panel, to lower the center of gravity when the inventive computer assembly is in the deployed configuration.

The panels are preferably joined to one another by conventional pivot assemblies such as are typically included in laptop computers. The pivot assemblies preferably include a conventional laptop-type hinge mechanism with a hinge axis adjacent and parallel to the boundary edges of the adjacent panels, and also typically includes an electrical interconnector mechanism to functionally connect components in adjacent panels by transmitting power and signals between panels. The electrical interconnector mechanism preferably is foldable or pivotable to maintain continuous functional connection throughout a broad range of panel angular positions, most preferably from a fully closed Z-computer configuration to a fully deployed configuration, and may be as simple as an appropriate tubular pass through for cable or wires. Alternatively, the electrical interconnection may be independently connectable and disconnectable by the user, to be "plugged in" after angular adjustment of the panels.

The deployed configuration of the Z-computer permits a number of unique advantages not found in conventional laptop/notebook configurations, in addition to greatly enhanced display functionality. The following are among the additional objectives and advantages of the invention:

1. To provide a display mechanism that raises the screen vertically from a head-down display to a heads-up display (with respect to the users), and thereby offer a range of adjustable positions.

2. To provide a display mechanism that moves the screen laterally fore and aft; for optimum eye focus, performance and comfort, and thereby offer a range of adjustable positions for users having differing visual focus distances of greatest comfort.

3. To provide the option of positioning the display within book reading distance, thus increasing the apparent display size in the viewer's field of vision with corresponding increases in productivity. Screen performance is greatly increased by the inventive Z-computer's forward and elevated position capability as compared to conventional notebook screen. With modern flicker free flat panel displays, working at close range to the display, as is obtainable in the Z-computer, is safe, less visually tiring, more efficient and accurate.

4. To provide a keyboard mechanism and configuration that lowers the keyboard and reduces keyboard profile in order to straighten and flatten wrist and finger positions, lower the forearms to a horizontal position, and maintain the upper arms next to the body.

5. To provide a robust and reliable folding/deployment structure, which includes rugged conventional laptop-type hinge mechanisms mounted directly to the sides of solid, integrated system panels. This eliminates stress concentrations points such as elongated extensions, legs, swivels, fragile mounting mechanisms, and the like.

6. To maintain motor and visual familiarity with existing conventional notebook interfaces, including folding to form a simple, robust, compact storage/carrying module.

7. To provide a simple, highly adaptable, mechanism and configuration which will accommodate the constant physical needs of computer users and the evolving hard and soft technologies of the future.

8. Accommodating internal and peripheral functions: The elevated CPU panel of the Z-computer has unobstructed front, back, and sides which provide far more usable area for accessory mounting and access as compared to the conventional notebook/laptop. This greatly increases the area and options for PC card slots, built-in expansion bays, battery bay, CD-ROM, DVD-ROM, ZIP or Super drive configurations; as well as speakers, variable controls, networking and communication ports (such as IR and USB). These functions and their access points can be enhanced and repositioned to meet engineering requirements/opportunities and changing technology.

9. To provide more ventilation, which results in cooler operation and higher performance, by means of the upwardly deployed CPU section which is open to the air on all sides permitting effective natural vertical convective air flow. With the inclusion of suitable inlet and outlet apertures, and internal flow passages, the upwardly directed orientation of the CPU panel permits greatly enhanced natural convective internal cooling airflow due to the "chimney effect" induced by the natural buoyancy of the airflow as it absorbs heat from internal components.

10. The Z-computer configuration produces a dramatic increase in the range of user-selectable display adjustability and flexibility over a conventional laptop, while still retaining the structural strength, compact stowage and deployment simplicity of a conventional laptop, and while making economical use of conventional laptop/notebook sub-components where appropriate.

11. The Z-computer is stowed in a tri-fold or "letter fold" configuration in which the flat panel display is protectively sandwiched between the keyboard and CPU panels.

BRIEF DESCRIPTION OF THE DRAWINGS

FIGS. 5A and B are two side elevation views of laptop/notebook type computers being operated by a user in typical aircraft-type seating, with the computer deployed on a seatback fold-down tray and showing typical viewing angles and body posture, with FIG. 5A illustrating a typical prior art laptop and FIG. 5B illustrating the preferred first embodiment of the Z-computer of the invention.

DETAILED DESCRIPTION INCLUDING THE BEST MODE OF CARRYING OUT THE INVENTION

The following detailed description illustrates the invention by way of example, not by way of limitation of the principles of the invention. This description will clearly enable one skilled in the art to make and use the invention, and describes several embodiments, adaptations, variations, alternatives and uses of the invention, including what I presently believe is the best mode of carrying out the invention.

In this regard, the invention is illustrated in the several figures, and is of sufficient complexity that the many parts, interrelationships, and sub-combinations thereof simply cannot be fully illustrated in a single patent-type drawing. For clarity and conciseness, several of the drawings show in schematic, or omit, parts that are not essential in that drawing to a description of a particular feature, aspect or principle of the invention being disclosed. Thus, the best mode embodiment of one feature may be shown in one drawing, and the best mode of another feature will be called out in another drawing.

The present best mode embodiment described below is an example of the z-computer system of the invention, and the specific dimensions and angles described are not limiting or mandatory, but illustrative of the range of preferred values. Since a number of the individual elements included in the assembly are conventional, such as conventional notebook hinges or keyboard modules, etc., the examples shown may have an number of suitable conventional equivalents.

FIGS. 1–7 illustrate the presently preferred first embodiment of the Z-computer of the invention 1. FIGS. 1–3 and 5–7 best show the deployed configuration of the Z-computer 1. The Z-computer 1 comprises three panels pivotally interconnected in a folding/unfolding configuration: The keyboard panel 10, central processor unit (CPU) panel 20, and flat-panel type display panel 30, are adjustable pivotally connected by inter-panel pivot or hinge assemblies, which may be conventional notebook computer offset hinges. The inter-panel pivot assemblies or hinges include a lower hinge 11 and an upper hinge 31. The lower hinge 11 is between the keyboard panel 10 and CPU 20, adjacent and having a hinge axis 41 generally parallel to the keyboard panel rear edge 19 and CPU or intermediate panel lower edge 21. The upper hinge 31 is between the CPU panel 20 and the display panel 30, adjacent and generally parallel to the CPU panel upper edge 27 and display panel lower edge 33.

The pivot or hinge assemblies 11 and 31 may comprise continuous hinges along the panel junctions or may comprise one or more discrete hinges distributed along the junction. In addition, the pivot assembliss 11 and 31 preferably also comprise conventional laptop computer electrical interconnectors to transmit signals and power between components mounted in the adjacent panels. Conventional frictional-resistance hinges may be included to permit the panels to remain fixed in any desired deployed angular position. Alternatively ratchet-type or other lockable hinges may be included to permit the panels to be fixed in adjustable deployed angular positions. Particular alternative types of lockable hinge assemblies are described below with respect to FIGS. 8 and 9.

Figure 3:
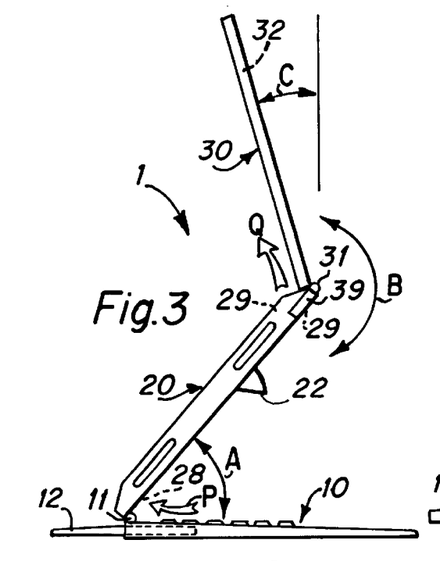
FIG. 3 is a side elevation view of the Z-computer of FIGS. 1 and 2 in deployed position, showing the typical angles of adjustment during unfolding and deployment.
Figure 4A:
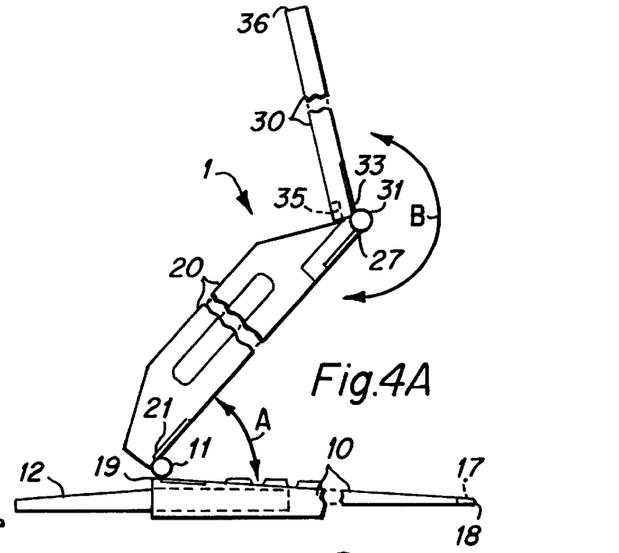
FIGS. 4A and B are two cut-away/foreshortened detail side elevation view of the Z-computer of FIGS. 1–3 showing particularly the offset upper and lower hinges and the panel folding configurations, with FIG. 4A being with the Z-computer in unfolded, deployed configuration and FIG. 4B being with the Z-computer in stowed or folded "letter style" configuration.

FIGS. 4A and B show more particularly the hinge arrangement of the Z-computer as seen in side elevation, and the range of motion from stowed (closed) to deployed (unfolded) configuration. In the closed configuration (FIG. 4B), the Z-computer 1 is preferably folded inward in "letter" fashion, with the display panel 30 protectively interleaved between the keyboard 10 and CPU 20. As the Z-computer is opened (FIGS. 1 and 3), the CPU 20 and display 30 rotate outward away from the keyboard panel 10 in the fashion of a letter being opened, the CPU 20 rotating through Angle A about lower hinge 11 and the display 30 rotating through Angle B about upper hinge 31 until the deployed or open configuration is achieved. Thus, the Z-computer 1 unfolds to deploy in a modified "Z shaped" configuration, as shown if FIGS. 1–3 and 4A, with the keyboard 10 being the horizontal base, the CPU 20 being the generally diagonal midportion of the "Z", and the display 30 unfolding generally backwards relative to the CPU 20 to form the upper arm of the "Z".

Figures 4B, 5A, 5B:
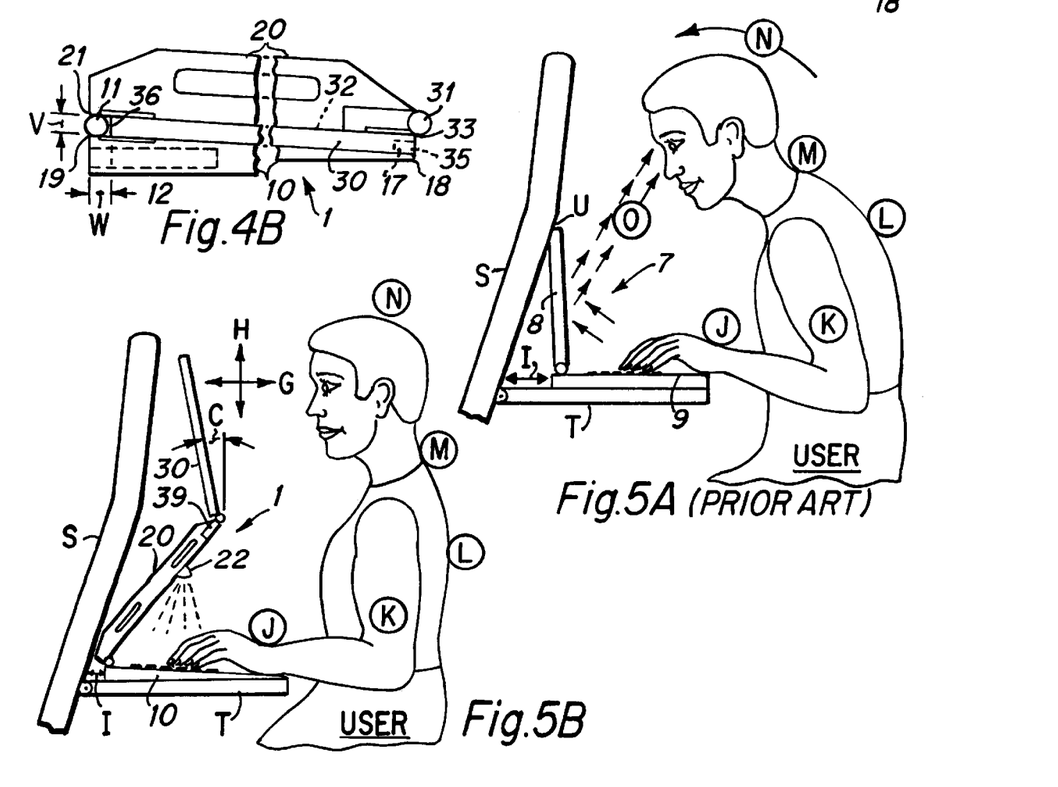

The typical and preferred deployment procedure for the Z-computer 1 of the invention is as follows: Referring to FIG. 4B, the closed Z-computer 1 is placed on the user-selected support surface (desk, table, lap, or the like) keyboard panel down; the latch 35 is released; the optional stabilizers 12 may be extended; the CPU 20 is over-rotated (generally beyond Angle A) to an angle sufficient to allow the display panel 30 to unfold and clear the keyboard 10; the display 30 is rotated in the direction of Angle B to about vertical; the CPU 20 is readjusted to the user-selected deployment Angle A, the optional clutch lock 40 may be tightened (located adjacent to lower hinge 11 on hinge axis 41), and the display panel 30 is rotated to the user-selected viewing position, Angle C.

As, noted above, the term "Z shaped" for the deployed configuration of the Z-computer 1 is used loosely, since the wide range of user-selectable deployment adjustments (as shown in FIG. &) at hinges 11 and 31 permits the CPU 20 and/or the display 30 to be adjusted to a generally vertical or near-vertical deployed position to suit user comfort and preference. The deployed position of the display 30 may be adjusted independently of the deployed angle of the CPU 20 to a viewing position with respect to the vertical as shown by Angle C in FIG. 3. Typically, the viewing Angle C will be slightly rearward of vertical, so that the display is angled upward towards the users face. However, the inherent flexibility of the Z-computer multi-hinge structure permits embodiments which are adjustable through very large angular ranges for particular use conditions. For example, the display 30 may be deployed to be horizontal or nearly horizontal if desired to face upward towards a user viewing downward from a standing position, such as in a point-of-sale product scanner terminal embodiment.

The CPU panel 20 may typically be the heaviest panel, particularly if a battery pack and power supply are mounted in the CPU 20. With the CPU 20 angled forward as shown in FIG. 3, the center of gravity of the overall deployed system is typically well forward of the rear edge of the keyboard panel 10 and line of lower hinge 11. This deployed configuration of the Z-computer 1 forms a stable cantilever structure with its center of gravity over the platform base, the keyboard panel 10.

The preferred Z-computer also has one or more stability-enhancing extendible supports or rear stabilizer legs 12. The stabilizers 12 are flush-mounted adjacent the rear of the keyboard panel 10 in the stored position, and may be extended rearward from the keyboard panel 10 to a deployed position in the direction shown by Arrow E in FIG. 1 to extend the effective depth of the base formed by the keyboard panel 10. In the event that user preference or needs dictate a more elevated and rearward position of the CPU 20 with a corresponding more rearward position of the center of gravity, the stabilizers 12 assure an adequate margin of stability against rearward tip-over (i.e., the stabilizers 12 support the computer 1 against forces tending to rotate the computer backwards). See, for example, the phantom line upper positions of CPU 20' and display 30' in FIG. 7.

Figure 1:
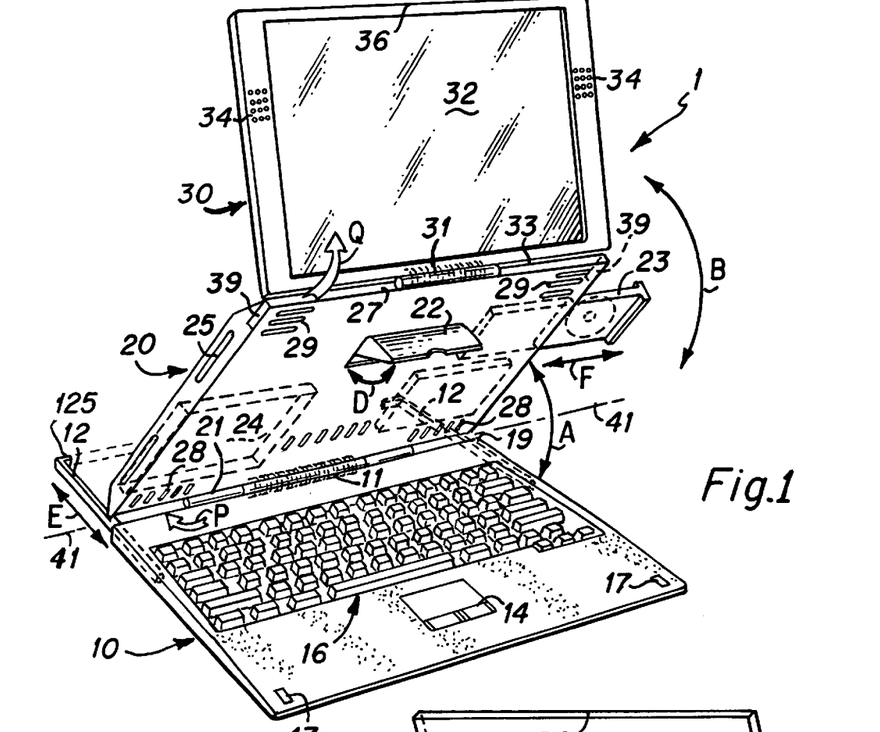
FIGS. 1 and 2 are two perspective views of the preferred first embodiment of the Z-computer of the invention in deployed position, FIG. 1 being viewed from the front left hand side and FIG. 2 being viewed from the rear left-hand side.

The preferred stabilizer is an opposed pair of leg extensions 12, 12' projecting rearward, one on each side of keyboard 10 (FIG. 1). The legs 12, 12' may be mounted to telescope from housings within the keyboard panel 10 by means of finger-operated push-pull tabs indented into the keyboard surface, to provide a flush stored configuration. Alternatively the deployment of the stabilizer legs may be by means of pivotal mountings (not shown) which permit the stabilizers to rotate outward from keyboard 10 to lock in extended position. In an additional alternative, similar side stabilizers (not shown) may be included extending sideways to protect against side tip-over.

In yet another alternative sideways spanning cross-member 13 (shown in FIG. 2 in phantom lines) may connect the outboard ends of the pair of stabilizer legs 12, 12' to form a closed loop, with the cross member 13 providing added stability, for example, in a lap-supported supported mode in which it extends laterally across the users upper legs adjacent to the knees. The cross-member 13 can optionally have a centrally enlarged mid-section which functions as a handle 13 for carrying the Z-computer 1 in the folded configuration. In an additional alternative, the outboard end 125 of stabilizer legs 12 may be made adjustable and lockable vertically downward from the horizontal in its extended position to serve as an angle adjustment for keyboard 2, if user-selected tilt adjustment is desired.

The Z-computer 1 is folded for storage by reversing the hinge rotations of deployment, and refolding the panels 10, 20, and 30 in letter fashion. Preferably, the hinges 11 and 31 are disposed as shown in FIG. 4B, so that the lower hinge 11 provides a sufficient offset V between the keyboard panel 10 and the CPU 20 when folded so that the display panel 30 fits between the folded panels 10 and 20, thus protecting the display face 32 from exposure to abrasion or damage. The length of display panel 30 may be selected to provide an horizontal offset W sufficient to clear hinge 11.

Figure 2:
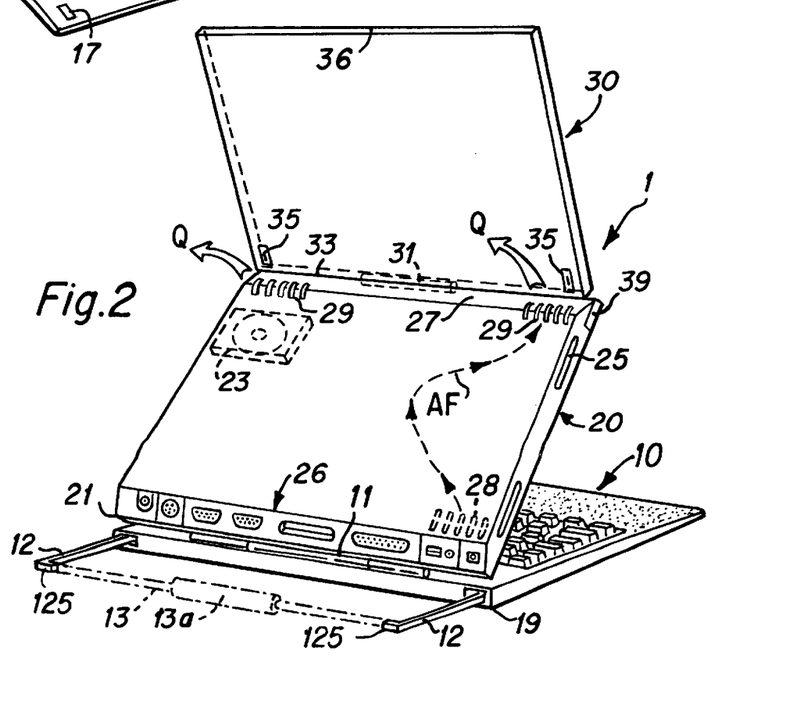

The Z-computer 1 may be retained in the stowed configuration by one or more conventional laptop computer button-actuated latch assemblies. For example, as seen in FIGS. 1, 2 and 4 A,B, a spaced pair of latches 35 may be mounted to the back of display panel adjacent hinge 31, so that the latches mate with a corresponding pair of catch slots 17 in the forward upper portion of keyboard panel 10 upon folding of the panels 10, 20 and 30 to the stowed configuration. Alternatively a single latch assembly may be used, preferably disposed adjacent the panel centerlines.

Conventional laptop electrical connectors, leads and wiring (not shown) may be used to interconnect the electronic and electrical functions of the three panels 10, 20, and 30. The connectors may be integral with the structure of hinges 11, 31, or may be separate connectors which provide for folding and unfolding of the Z-computer, such as by flexible ribbon-type wiring.

The Z-computer configuration of the invention 1 is highly adaptable with respect to the placement of accessories. In particular, in addition to the keyboard panel, the conveniently accessible front, sides and back of the CPU panel 20 provide for the placement of a much wider range of bays, ports and auxiliary devices than is the case with a conventional laptop configuration. For example, as seen in FIG. 1, the deployment of the CPU 20 overlooking the keyboard panel 10 allows a centrally-located light fixture 22 to be placed so as to directly and effectively illuminate the keyboard area from above, while only requiring a low power consumption, generally comparable to popular battery powered "book lights". The light 22 may be pivotally mounted including an integral reflector, so as to rotate and retract into the CPU panel 20 as the Z-computer 1 is folded for storage. Additional desk lights 39 may be mounted on the upper left and/or right corners of the CPU panel 20 to illuminate desktop surfaces near the user's sides.

Speakers 34 may be mounted as shown in FIG. 1 on each side of display panel 30, or alternatively may be mounted elsewhere, such as on CPU 20. A CD reader or reader/writer 23 may be housed in the side of CPU 20, to telescope sideways from CPU 20 as shown for loading/unloading. Alternatively, the CD reader may include a door (not shown) folding outward and downward from the forward face of CPU 20 for loading/unloading. Other accessories may include removable-media hard-drives, floppy drives, PCM-CIA devices, and the like.

In addition to flexible placement of accessories, the Z-computer configuration of the invention 1 is particularly well suited to provide enhanced cooling for the CPU, power supply and other heat-producing components, as compared to conventional laptops.

In the conventional laptop the heat-producing components are located in a combined keyboard/CPU panel, and are prevented from dissipating heat through the panel bottom which generally rests on an insulating support such as a desktop. The top of the conventional keyboard/CPU panel is also largely covered by keyboard, touchpads and the like, and is not readily available as a site for vents and fan openings. In addition, the conventional keyboard/CPU panel has sides which are typically used for accessory bays and connection ports, and is are situated close to desktop surface, where airflow is often blocked, such as by nearby objects, books and the like resting on the.

In contrast, the heat-producing components of the Z-computer of the invention 1 are preferably chiefly located in CPU panel 20, which as noted, has front, sides and back open, elevated and exposed to the air, providing a large area for vents and fan openings, and also promotes effective, heat dissipation by radiation and convection from the outside surfaces of the CPU panel 20.

In addition, in an important advantage of the Z-computer configuration, the open, elevated, semi-vertical configuration of the CPU 20 permits enhanced internal convective cooling air flow by a "chimney effect". As shown in FIGS. 1–3, the preferred cooling air inlet vents 28 in the lower area adjacent the lower edge of the CPU 20 are open to incoming airflow (Arrow P). The inlet vents 28 communicate with outlet vents 29 adjacent the upper edge of the CPU 20 via internal airflow passages (shown schematically as Arrows AF) within CPU 20 to discharge the airflow (Arrow Q) from the upper portion of CPU 20 (See FIG. 2). The internal airflow passages bring the airflow into thermal contact with internally-mounted heat-generating components, such as the CPU, systemboard, power supply and the like.

The internal airflow passages may comprise communicating clearance spaces between internally-mounted components. The internal airflow passages may also include guide conduits and may also include other elements to enhance thermal contact between the airflow and the heat-generating components, such as heat sinks, cooling fins and the like. Heat absorbed by the internally flowing air through thermal contact within CPU 20 creates buoyancy forces upon the airflow to drive the airflow generally upward to the outlet vents 29. Conventional cooling fans and conventional fan inlet/outlet vents may also be included to assist cooling, for example with respect to such components as high-performance IC processor chips and the like. Conventional cooling mechanisms such as fans may also be included in the keyboard panel, if needed for heat generating components mounted there, and for operation in a closed configuration, such as with a docking station and remote keyboard/monitor combination.

As shown in FIG. 2, The Z-computer 1 preferably includes connector ports 26 mounted on the canted rear edge of the CPU panel 20. This port location permits the ports 26 to be more readily accessible in the Z-computer 1 than the ports of a conventional laptop, and permits a thinner profile of the keyboard panel 10.

The Z-computer may optionally be configured to mate with a "docking station" or port duplicator as in conventional laptops. Conventional connectors included in the docking station (not shown) may be used to mate with conventional connectors of the Z-computer 1 (see connector area 26 in FIG. 2) to create interconnections with power supply, network and/or modem connections, remote accessories, remote and auxiliary displays, keyboards, I/O connections, and the like. The connector area may alternatively be located on the rear of the keyboard panel 10, in the manner of conventional laptops. The docking station (not shown) permits the Z-computer to be stored to the folded position in a desktop installation while retaining such interconnections. The Z-computer may then be deployed as described herein, with such interconnections ready for use. As with existing docking stations for use with conventional laptops, connections may be included to operate a remote monitor, keyboard, mouse, and/or other remote device.

Many of the subcomponents of the Z-computer may be conventional laptop/notebook computer components, such as flat-panel display modules, hinges, processors, systemboards, I/O boards, memory devices, power supply, batteries, I/O devices, key modules and the like. Likewise installed components and accessories, such as track/ball, touch pad or other conventional pointing device, and the connectors for external power, network lines, telephone lines, remote accessories and the like, may be conventional laptop/notebook computer components. The panels and component mountings may be constructed by use of conventional computer materials and may be assembled by conventional manufacturing and quality control methods. One of ordinary skill in the art will be able to make and use the Z-computer of the invention including the best mode thereof, without undue experimentation, by reference to this disclosure and known art.

As with conventional laptops and notebook computers, the selected overall dimensions and weight of the Z-computer preferably will balance the values of lightweight, compact portability on the one hand, and the values of relatively large display area (note the advantages illustrated in FIG. 7 as discussed below), enhanced accessory, battery and I/O functionality, cooling, illumination and user keyboard ergonomics on the other hand. Thus so: the optimum size and weight of the various elements Z-computer will vary with respect to particular market and user demands, and between desktop or portable embodiments.

The keyboard panel 10 and display panel 30 may generally have lengths and widths typical of conventional laptop and notebook computers. The length and width of the CPU will preferably be selected so as to ensure convenient folding storage in the "letter fold" configuration. As an example, a notebook embodiment of the Z-computer may have dimensions, in its closed or folded configuration, substantially similar to the commercially available laptop/notebook computers, such as the Macintosh G3 Powerbook, the Dell Latitude Cpi notebook, and the like.

Exemplary dimensions of the Z-computer of the invention as an embodiment sized to include about a 14 inch (35 cm) diagonal measure screen (32 in FIGS. 1–7) in the display panel (30); may have typical dimensions, in its closed configuration, as follows: an overall width (in the keyboard side-to-side direction) of about 32 cm (13 in.); and overall depth (keyboard front-to-back direction) of about 28 cm (11 in.); and a overall folded thickness at about 4.5 cm (1.8 in.).

In the open position, the exemplary embodiment may have typical dimensions may as follows:

Keyboard (10): width and depth about 32 cm (13 in.) and about 28 cm (11 in.) respectively, with the thickness tapering from about 1.5 cm (0.6 in.) in the back to nearly flush with desktop in front.

Display height (30): With the CPU (20) deployed at about 45°, and display panel (30) deployed vertically, overall height is about 43 cm (17 in.) with display bottom at about 23 cm (9 in.). With the CPU (20) deployed at a higher angle of about 67°, the overall height is increased to about 48 cm (19 in.) with display bottom at about 28 cm (11 in.).

By contrast, a conventional laptop of the same screen size (14 inch diagonal) the overall deployed height of the display (8 in FIG. 6) would be limited to about 29 cm (11 in.) and would be about twice as far from the user's eye position.

As shown in FIGS. 5A and 5B, the highly flexible deployment shape of the Z-computer 1 of the invention is particularly advantageous as compared to a conventional laptop 7 for deployment in the physical restrictions of commercial aircraft-type seating S. FIG. 5A shows that when a conventional laptop 7 is deployed on a fold-down seatback tray table T, the conventionally mounted display 8 strikes the seatback at point U as it is opened, preventing the rotation of the display 8 to a normal viewing angle. Efforts to rotate the display 8 further require that the laptop 7 be moved toward the user along the surface of tray table T to leave an offset I between the laptop and the seat S. Inevitably, both the viewing angle is poor, resulting in reflected glare O off display 8, and the keyboard 9 is moved too close to the user so as to require uncomfortably bent elbows K. The wrist position J tends to be uncomfortably high and the user's back L, neck M and head N tend to be tilted forward, for an overall inconvenient and unhealthy working posture. In other words, the conventional laptop 7 typically requires the user to "hunch over".

In contrast, as shown in FIG. 5B, the Z-computer 1 of the invention may be deployed with the keyboard panel 10 placed closely adjacent the rear of the tray table T so that the offset I is essentially eliminated, allowing natural and comfortable positions of elbows K and wrists J. The tapered keyboard panel 10 further permits a more comfortable wrist position J as compared to the raised keyboard 9 of a conventional laptop 7. The user's back L, neck M and head N may be fully erect in a comfortable posture. The display 30 may be adjusted in both vertical direction H and horizontal direction G and angle C to have clearance from seat S while positioned at an optimum distance directly facing the user so as to eliminate glare.

Figure 6:
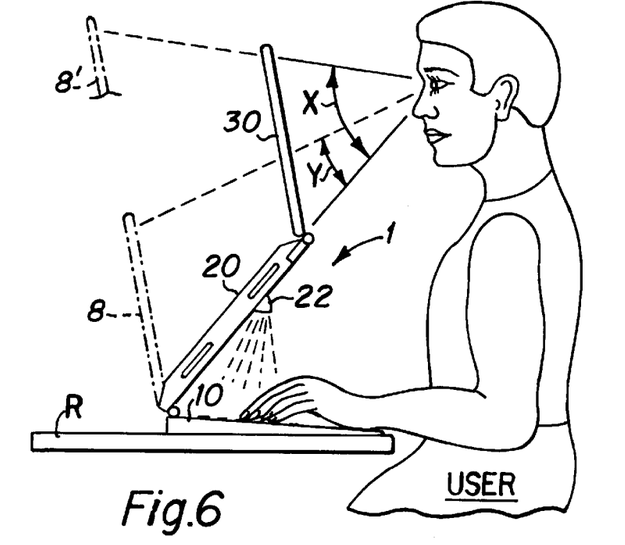
FIG. 6 is an side elevation view comparing the effective viewable display size of the preferred embodiment of the Z-computer with that of a prior art laptop display (shown in phantom lines).

The comparison between the Z-computer 1 and conventional laptop 7 and the advantages noted above with respect to aircraft seating deployment also generally apply to desktop and other conventional user-selected deployment locations. As shown in FIG. 6, the display 30 of the Z-computer 1 of the invention deployed on desktop R may be adjusted to a position much closer to the face of the user as contrasted to the conventional laptop display 8. The user may typically adjust display 30 to be as near to the face as is comfortable for the viewer. A typical comfortable user-selected display position for the Z-computer 1 may have a lateral distance of from about 20 to about 30 cm. (8 to 12 inches) from the eyes, as compared to the present approximately 50 to 60 cm. (20 to 24 inches) viewing distance of conventional laptop 8. The conventional display 8 is illustrated for comparison in phantom lines superimposed as if hinged to the rear of keyboard panel 10, the conventional display 8 being the same size as Z-computer display 30. The conventional display must necessarily remain far from the user's face. regardless of user preference.

Thus, for any given pre-selected display panel size, the display viewing arc X of the Z-computer 1 is much larger than the conventional laptop viewing arc Y (indeed it may by greater than twice as large). In other words, displayed visual features simply look larger and usable resolution is greater on the Z-computer display 30. Flat panel display technology has advanced and continues to advance rapidly, and the optimized display deployed position of the Z-computer permits the user to gain the full advantage of higher resolution and refresh rates, as these are now available and continuing to improve. In effect, a conventional display would have to be of an enormous, inconvenient and expensive large size, as shown by fragment phantom over-sized display 8', to have an effective image size equal to the Z-computer display 30.

Figure 7:
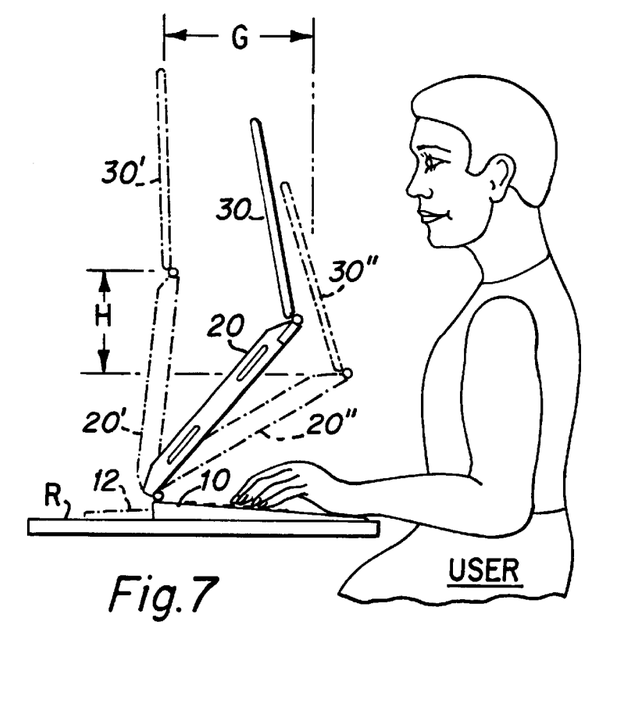
FIG. 7 is an side elevation view comparing a typical deployment configuration (solid lines) and exemplary higher and lower deployment configurations (phantom lines) illustrating the broad range of adjustment available to suit user preferences and needs.

As shown in FIG. 7, the display 30 of the Z-computer 1 of the invention may be deployed, by user selected adjustment of the hinges 11 and 31 permit the Z-computer to be conveniently user-adjusted through an inherently wide range of user-selectable deployment configurations. This allows the display panel 30 to be adjusted vertically and horizontally to suit user preference, comfort, eyesight, corrective eyeware, and the like, as shown by Arrows H and G. The display position 30 shown in solid lines is a typical user-selected example for a seated user at a desktop R. The phantom line image 30' is exemplary of a higher and more distant user-selected configuration, also employing stabilizers 12 in extended position. The phantom line image 30" is exemplary of a lower and closer user-selected configuration.

The range of positions shown in FIG. 7 is not limiting for the Z-computer 1 of the invention. With suitable production detailing of the hinges 11 and 31, a much greater range of rotational adjustment is feasible than is shown in FIG. 7. Alternatively permanent, releasable or adjustable stops may be included in hinges 11 and 31 to limit rotation to a preselected range for each hinge. For special use conditions, such as a standing user of a Z-computer deployed at a work-counter, it may be desirable to rotate the display 30 to a nearly horizontal configuration facing upward. In an alternative example, stabilizers 12 of may be of selected length so that the CPU panel 20 may be tilted back into a substantially over vertical position.

The internal friction of conventional laptop hinges which may be included as hinges 11 and 31 may be sufficient to provide a pre-selected degree of deployed stability and rotational resistance for the CPU 20 and display panel 30. In the event that greater pivotal stability is desired at the pivot assembly hinge axis, various forms of conventional user-adjustable or user-releasable hinge-lock mechanisms may be included, such as clutch locks, pin-type locks, rachet locks, detents, lockable inter-panel links, and the like.

Figures 8, 10:
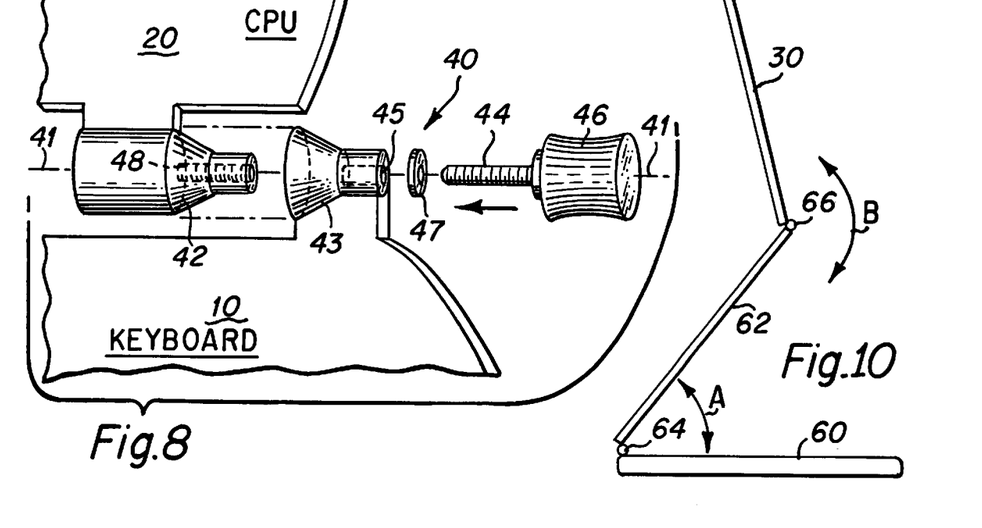
FIG. 8 is an exploded perspective view of one alternative embodiment of an offset hinge and clutch lock assembly for the Z-computer of the invention.
FIG. 10 shows an alternative second embodiment of the Z-computer of the invention in side elevation view, in which the CPU and keyboard are combined in a single lower unit as in a conventional laptop and including a hinged riser panel interconnecting the CPU/keyboard and the display.

For example, FIG. 8 illustrates one alternative of a hinge clutch lock 40 which may be included in one or both of the lower or upper hinge assemblies (11, 31 in FIGS. 1–7) to release, adjust, and secure the hinge at a user-selected angular position. In particular, clutch lock 40, or other equivalent hinge locking device, may be desired to secure the CPU 20, which is typically the heaviest panel, in its deployed and position. Conventional pivot or hinge locks or stops, such as wing nuts or thumb-screw stops used in camera tripod swivel joints, may be alternatively included. The clutch lock 40 may be integrally constructed as a portion of hinge 11 or 31, or may be a separate element aligned with hinge axis 41. In an additional alternative, either/both of the lower hinge 11 and/or the upper hinge 31 can have one or more preset ratchet-like "click-stops" in the hinge mechanism to detain the hinge at a user-selected detent angle.

The conical socket-type clutch lock 40 is shown installed between CPU 20 and keyboard 10, aligned with hinge axis 41 of the lower hinge (not shown in FIG. 8). The lock comprises a cone shaped socket female clutch 43 fixed to one panel (the keyboard 10 in this example), a solid cone male clutch 42 as fixed to the adjacent panel (the CPU 20 in this example), and a threaded tension screw 44. The screw 44 passes through an unthreaded bore 45 in socket 43 into a threaded hole 48 in the solid, cone-shaped male clutch 42. The screw 44 has a turn knob 46 affixed to its head which permits it to turned and tightened (optionally bearing on washer 47) to presses cone socket clutch 43 into mating frictional contact with solid cone 42. Screw 44 may be tightened produce a selectable amount of securing friction between the clutch socket 43 and cone 42 to "lock" the panels 10 and 20 in position. To loosen or unlock the clutch 40, the user backs off the tension screw 44 in the opposite rotational direction. The socket component 43 is may be alternatively mounted to either the keyboard or CPU panel and the cone 42 is mounted to the opposite panel. Upon tightening, pressure and friction applied by the turnscrew 44 to the cone-and socket clutch 42, 43 "locks" the panels 10, 20 in position. The conical faces may be slightly roughened to provide excellent frictional grip, or may have molding ribs and grooves or provide preselected angular orientation.

Figure 9:
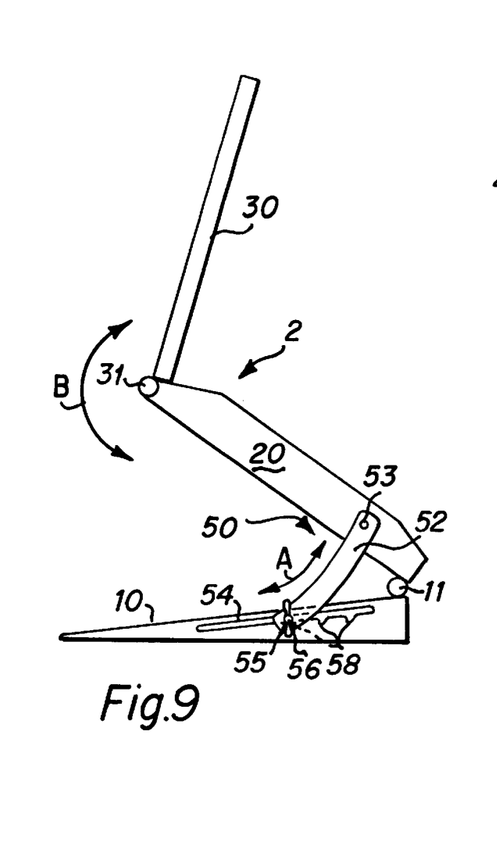
FIG. 9 shows a alternative third embodiment of the Z-computer of the invention in side elevation view, including an optional slide-channel type panel lock.

FIG. 9 is a side view of an alternative second embodiment of the Z-computer of the invention 2 including an alternative hinge lock comprising a conventional box-lid type slide-channel type panel lock 50. The slide lock 50 comprises link 52 which engages channel 54 mounted on at least one side of the keyboard panel 10 adjacent to lower hinge 11. The link 52 engages channel 54 by means of pin 55. The link 52 is pivotally mounted to pivot 53 on the side of CPU panel 20, and spans between, the side of CPU 20 and the channel 54 side of keyboard 10. A thumb screw 56 may be threaded about the outside of pin 55 extending pivotally through link 52, may retractably mount pin 55 so as pin 55 pulls link 52 into tight contact with channel 54 so as to lock the link 52 at a user-selected point in the channel 54 as the thumbscrew 56 is tightened, thus fixing the CPU at adjustable Angle A.

In addition to or as an alternative to the thumb-screw 56, a series of detents 58 may be provided in the lower surface of channels 54 so that the user may select a particular detent to fix the CPU 20 at Angle A This slide lock 50 may be used as an alternative to the hinge-axis clutch lock (40 in FIG. 8). The slide lock 50 may be particularly suited to larger and heavier alternative embodiments of the Z-computer sized for permanent desk-top installations, or as special purpose Z-configuration computers, such as scanner/productcode-reader/display units. As in the embodiment shown in FIGS. 1–7, the upper hinge 31 may be provided with sufficient inherent internal friction to stabilize the deployed position of the display 30, or an additional panel lock (not shown) may be used to lock the display Angle B.

FIG. 10 shows an alternative third embodiment of the Z-computer system of the invention 3 in which the CPU (and associated components) and keyboard are combined in a single lower base panel unit 60 in the manner of a conventional laptop. The intermediate panel comprises riser panel 62, which is pivoted by lower hinge 64 at the rear of Keyboard/CPU panel 60 and spans to pivot by upper hinge 66 at the base of display panel 30. The Z-configuration is adjustable about hinges 64 and 66 in the same manner in which the preferred Z-computer embodiment of FIGS. 1–7 adjusts about hinges 11 and 31 to fix the riser panel 62 at Angle A and the display panel 30 at Angle B. Although this alternative embodiment 3 does not facilitate some of the advantages of the raised CPU, and is not the preferred embodiment, the versatility of display panel deployment due to the Z-configuration is fully obtainable in this alternative. As in the letter-folding manner of the preferred embodiment 1, the hinge offsets are in the alternative embodiment 3 are preselected to permit the display 30 to be folded between riser panel 62 and CPU/keyboard 60 for stowage.

Figure 11A:
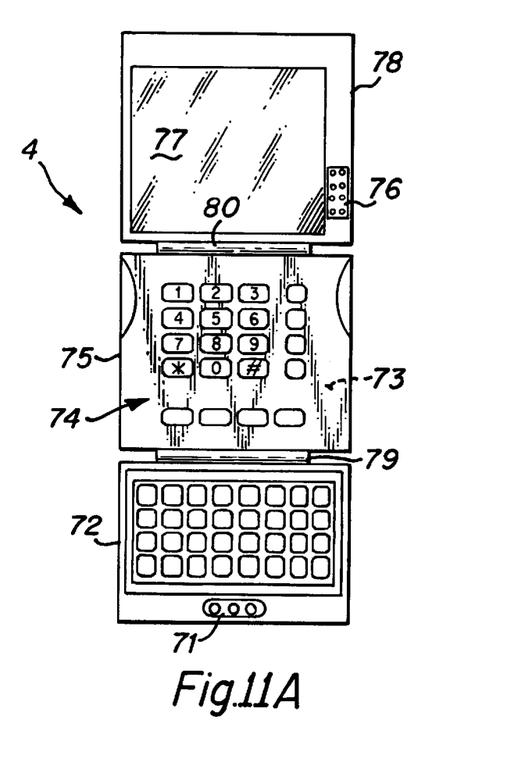
FIGS. 11A, B and C show an alternative fourth embodiment of the Z-computer of the invention adapted and sized to include cell-phone and wireless palmtop functionality, FIG. 11A being a frontal elevation in deployed configuration, FIG. 11B being a side elevation in deployed configuration, and FIG. 11C being a side elevation in folded or stowed configuration.
Figure 11B:
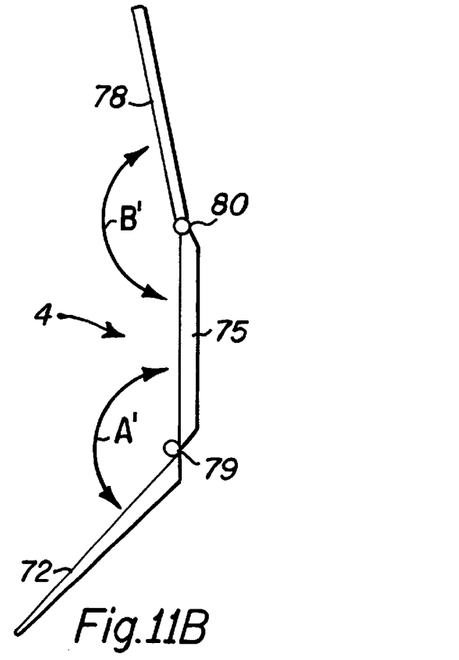
Figure 11C:
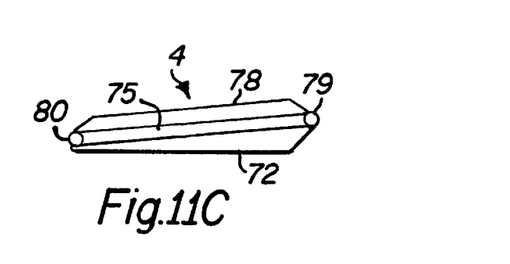

FIGS. 11A, B and C show an alternative fourth embodiment of the Z-computer of the invention 4 adapted and sized to include cell-phone and wireless palmtop functionality (herein "Z-cell"), FIG. 11A is a frontal elevation in deployed configuration, FIG. 11B is a side elevation in deployed configuration, and FIG. 11C is a side elevation in folded or stowed configuration. In this exemplary embodiment 4, a palmtop-type key module 70 and a microphone 71 are mounted on the lower panel 72, the CPU/transceiver 73 and cell-phone type dialing/function key pad 74 are mounted on the middle panel 75 and an earphone speaker 76 is mounted adjacent the screen 77 of the display panel 78. The lower panel 72 is pivoted by lower hinge 79 to middle panel 75, and is user-adjustable to a comfortable mouthpiece Angle A'. The display panel 78 is hinged to the middle panel 75 by upper hinge 80, and is user-adjustable to a comfortable earpiece Angle B'. The Z-cell 4 may be deployed also in desktop configuration by adjustment of Angle A' and Angle B' to approximately as described above and shown for the preferred Z-computer embodiment 1 in FIG. 3. In this desktop configuration of Z-cell 4, a speakerphone option may be included to allow hands-free communication, and the keyboard 70 may be used together with display 78 for palmtop computing operation.

Industrial Application

It should be understood that various modifications within the scope of this invention can be made by one of ordinary skill in the art without departing from the spirit thereof.

The Z-computer system and its Z-shaped deployed configuration may utilize other hinge, strut designs and deployment mechanisms consistent with the inventive principals. The unique movement and variable configuration permitted plurality of inter-functioning panels by multiple hinge interconnections is adaptable to wide variety of applications. The described embodiments of the Z-computer configuration provide efficiency, simplicity, durability, user flexibility and low cost. Other components and designs may be utilized to realize the Z-computer configuration system, without departing from the principles of the invention.

The Z-computer Mechanism and Configuration have at least the following product application and uses:

1. Notebook, laptop, portable computers;
2. Desktop computers with flat panel displays;
3. All tactile-display systems, including cash registers, point of sale, inventory, information terminals, product-identification code scanners and display units, CAD or design systems, interactive games, Internet television, CD, and DVD players;
4. Instructional, entertainment and audio-visual platforms; and
5. Communications equipment including cell phones and personal digital assistant devices.

It is therefore wished that this invention to be defined by the scope of the appended claims as broadly as the prior art will permit, and in view of the specification if need be.

PARTS LIST

Notice: This Parts List is Provided to Assist Examination

It May be Deleted at the Time of Issuance to Avoid Redundancy.

A CPU unfolding rotation angle
B display unfolding rotation angle
C display viewing angle
D light reflector rotation
E stabilizer telescoping direction
F CD drive telescoping motion
G display horizontal adjustment
H display vertical adjustment
I keyboard offset from seat
J wrist position
K elbow position
L back position
M neck position
N head position
O reflected glare from display
P cooling air inflow
Q cooling air outflow
R desktop
S aircraft type seat
T folddown tray table
U seatback contact point
V lower hinge vertical offset when closed
W lower hinge horizontal offset/clearance
X Z-computer viewing arc
Y conventional laptop viewing arc
AF internal airflow path(s)
1 Z-computer (preferred first embodiment)
2 Z-computer with slide channel lock (second embodiment)
3 Z-computer with combined keyboard and CPU (third embodiment)
4 Z-computer cell phone/palm top (fourth embodiment)
7 conventional laptop
8 conventional laptop display panel
10 keyboard or base panel
11 lower hinge
12 rear stabilizer
13 stabilizer cross-member/handle
14 user interface device, e.g. trackball, etc.
16 key module
17 latch slot
18 keyboard panel front edge
19 keyboard panel rear edge
20 CPU or intermediate panel
21 CPU panel lower edge
22 light (for keyboard illumination)
23 CD player/writer
24 battery compartment
25 accessory bays (floppy, PCMCIA, removable harddrive, etc.)
26 port and connector area
27 CPU panel upper edge
28 cooling airflow inlet
29 cooling airflow outlet
30 display panel
31 upper hinge
32 flat panel display screen
33 display panel lower edge
34 speaker
35 button released spring latch
36 display panel upper edge
39 side-mounted desk lights
40 clutch lock
41 hinge axis
42 solid cone
43 cone socket
44 tension screw
45 socket bore
46 turn knob
47 washer
48 threaded hole
50 slide-channel panel lock
52 link
53 pivot
54 channel
55 pin
56 thumb screw
58 detent
60 combined keyboard/CPU
62 riser panel 64 lower hinge
66 upper hinge
70 palmtop key module
71 microphone
72 lower panel
73 CPU/transceiver
74 phone pad
75 middle panel
76 earphone
77 screen
78 display panel
79 lower hinge
80 upper hinge
125 rotatable grips on stabilizers
130 handle grip

What is claimed is:

1. A computer having a housing pivotally deployable by a user between a first, folded, closed configuration and at least a second, unfolded, deployed configuration for use on a support surface, comprising in operative combination:
   a) a base panel housing having a rear edge, a front edge, and including a keyboard;
   b) an intermediate panel housing having a lower edge and an upper edge;
   c) a display panel housing having a lower edge and including a flat panel display in at least one face thereof;
   d) at least one of said base panel housing, said intermediate panel housing and said display panel housing includes a plurality of conventional computer components, component mountings and electrical interconnectors;
   e) a lower pivot assembly mounted to said base panel housing and said intermediate panel housing, said lower pivot assembly having a lower hinge axis adjacent to each of said base panel housing rear edge and intermediate panel housing lower edge, to foldably connect said base panel housing and said intermediate panel housing;
   f) an upper pivot assembly mounted to said intermediate panel housing and said display panel housing, said upper pivot assembly having an upper hinge axis adjacent each of said intermediate panel housing upper edge and display panel housing lower edge, to foldably connect said intermediate panel housing and said display panel housing;
   g) at least one electrical interconnector communicating between said panel housings adjacent said hinges, said at least one electrical interconnector functionally interconnecting selected ones of said plurality of computer components;
   h) in said unfolded, deployed configuration:
      (i) said base panel housing is supported upon said support surface;
      (ii) said intermediate panel housing is deployed above said base panel housing in a generally upwardly directed angle with respect to said support surface; and
      (iii) said display panel housing is deployed above said intermediate panel housing in an generally upwardly directed angle with respect to said support surface wherein said flat panel display is viewable by said user;
   i) said base panel housing, said intermediate panel housing and said display panel housing fold to lie generally parallel and closely adjacent to one another in said a closed configuration; and
   j) in said closed configuration said display panel housing is disposed between said base panel housing and said intermediate panel housing.

2. A computer as in claim 1, wherein said intermediate panel housing includes a CPU.

3. A computer as in claim 1, wherein said base panel housing includes a CPU.

4. A computer as in claim 1, wherein said base panel housing is tapered so as to slope generally downwards from said rear edge to said front edge.

5. A computer as in claim 1, wherein said intermediate panel housing includes:
   a) at least one internally-mounted heat-generating component;
   b) at least one air inlet vent adjacent said intermediate panel housing lower edge;
   c) at least one air outlet vent adjacent said intermediate panel housing upper edge;
   d) at least one internal passage for airflow communicating between said inlet vent and said outlet vent; and
   e) said passage is configured to bring said airflow into thermal contact with said heat-generating component when said computer is in said deployed configuration to cause said airflow to absorb heat from said component and to convectively cool said component by said airflow between said inlet vent and said outlet vent.

6. A computer as in claim 1, wherein at least one of said upper and lower pivot assemblies includes a user-adjustable hinge lock mechanism.

7. A computer as in claim 1, wherein said intermediate panel housing includes a light for keyboard illumination integrated in said panel.

8. A computer as in claim 1, wherein said base panel housing includes at least one retractable stabilizer member, said stabilizer member mounted to said base panel housing, and said stabilizer member is deployable to extend generally horizontally rearward from adjacent said rear edge of said base panel housing, so as to support said computer against rearward tip-over.

9. A computer as in claim 1, wherein said computer is a portable computer.

10. A computer as in claim 1, wherein said computer is a desk-top computer.

11. A computer as in claim 1, wherein said computer includes a cell-phone.

12. A computer as in claim 1, wherein said computer includes a product identification code scanner.

13. In a data processing user interface system for computing and communication devices having a multi-part housing which includes a plurality of conventional computer components, component mountings and electrical interconnections, a user input device, and a deployable flat panel display pivotally deployable by a user between a first folded closed configuration and at least a second, unfolded deployed configuration for use on a support surface, the improvement in said system comprising a configuration structure having:
   a) a base panel housing having a rear edge, a front edge, and including said manual user input device;
   b) an intermediate panel housing having a lower edge and an upper edge;
   c) a display panel housing having a lower edge and including at least said flat panel display;
   e) a lower pivot assembly mounted to said base panel housing and said intermediate panel housing to foldably connect said base panel housing and said intermediate panel housing; said lower pivot assembly has a hinge axis adjacent and substantially parallel to each of said base panel housing rear edge and intermediate panel housing lower edge; said lower pivot assembly includes at least one electrical interconnector communicating to functionally interconnect at least one of said computer components in each of said base and intermediate panel housings;

f) an upper pivot assembly mounted to said intermediate panel housing and said display panel housing to foldably connect said intermediate panel housing and said display panel housing; said upper pivot assembly has a hinge axis adjacent and substantially parallel to each of said intermediate panel housing upper edge and display panel housing lower edge; said upper pivot assembly includes at least one electrical interconnector communicating to functionally interconnect at least one of said computer components in each of said intermediate and display panel housings;

h) in said unfolded, deployed configuration:
(i) said base panel housing is supported upon said support surface;
(ii) said intermediate panel housing is pivotally deployed above said base panel housing in a generally upwardly directed angle with respect to said support surface; and
(iii) said display panel housing is pivotally deployed from said intermediate panel housing in a generally upwardly directed angle with respect to said support surface directed at an angle with respect to said user wherein said flat panel display is viewable by said user in an elevated, ergonomically improved deployed configuration; and i) in said closed configuration said display panel housing is disposed between said base panel housing and said intermediate panel housing.

14. A data processing user interface system as in claim 13, wherein said base panel housing includes at least one stabilizer member, said stabilizer member is retractably mounted to said base panel housing, and said stabilizer is deployable to extend generally horizontally rearward from adjacent said rear edge of said base panel housing, so as to support said interface system against rearward tip-over.

15. A data processing user interface system as in claim 13, wherein at least one of said upper and lower pivot assemblies includes a user-adjustable hinge lock mechanism.

16. A data processing user interface system as in claim 13, wherein said intermediate panel housing includes:
a) at least one internally-mounted component which generates heat from use;
b) at least one air inlet vent adjacent said intermediate panel housing lower edge;
c) at least one air outlet vent adjacent said intermediate panel housing upper edge;
d) at least one internal passage for airflow communicating between said inlet vent and said outlet vent; and
e) said passage is configured to bring said airflow into thermal contact with said heat-generating component when said interface system is in said deployed configuration to cause said airflow to absorb heat from said component and to convectively cool said component by said airflow between said inlet vent and said outlet vent.

17. A data processing user interface system as in claim 13, wherein said manual user input device in said base panel housing is a keyboard.

18. A data processing user interface system as in claim 17, wherein said intermediate panel housing includes a CPU.

19. A data processing user interface system as in claim 17, wherein said base panel housing includes a CPU.

20. A data processing user interface system as in claim 17, wherein said base panel housing, said intermediate panel housing and said display panel housing fold to lie generally parallel and closely adjacent to one another in said a closed configuration.

21. A data processing user interface system as in claim 17, wherein said base panel housing is tapered so as to slope generally downwards from said rear edge to said front edge.

22. A data processing user interface system as in claim 17, wherein said intermediate panel housing includes a light for keyboard illumination integrated in said panel.

23. A data processing user interface system as in claim 17, wherein said interface system is portable.

24. A configuration structure for a computing or communication electronics device including a display and a CPU, wherein said device configuration structure is a three-panel housing assembly comprising:
a) a first base panel housing;
b) a second intermediate panel housing which includes:
i) at least one internally-mounted heat-generating component;
ii) at least one air inlet vent adjacent said intermediate panel housing lower edge;
iii) at least one air outlet vent adjacent said intermediate panel housing upper edge;
iv) at least one internal passage for airflow communicating between said inlet vent and said outlet vent; and
v) said passage is configured to bring said airflow into thermal contact with said heat-generating component when said computer is in said deployed configuration to cause said airflow to absorb heat from said component and to convectively cool said component by said airflow between said inlet vent and said outlet vent;
c) an upper display panel housing;
d) said device is movable between a closed position and a deployed, use position;
e) said base and display panel housings being hinged to said intermediate panel housing at opposed adjacent marginal edges of said intermediate panel housing, so that said device, in its deployed, use position is generally Z-shaped viewed in side elevation;
f) in said deployed, use position said panel housings are adjustable horizontally and vertically with respect for each other to provide improved ergonomic viewing; and
g) in said closed position, said display panel housing is folded to be disposed adjacent said intermediate panel housing.

25. An electronics device as in claim 24, wherein said device is a computer.

26. An electronics device as in claim 25, wherein said computer is portable.

27. An electronics device as in claim 24, wherein said device is a communications device.

28. An electronics device as in claim 27, wherein said device is a cell phone.

29. An electronics device as in claim 24, wherein said device is a video display device.

30. An electronics device as in claim 29, wherein said device is a one of a digital video player, a CD player and a television.

31. An electronics device as in claim 24, wherein said device is personal digital assistant.

32. A method of deployably mounting a flat panel display on an electronic device for improved ergonomic viewing by a device user, said electronic device including a plurality of electronic components and a base panel housing for supporting said electronic device on a support surface, said base panel housing having, relative to said viewer, a front edge proximate to said viewer and a rear edge distal to said viewer, said method comprising the steps of:

a) pivotally mounting an intermediate panel housing from said base panel housing at a first pivot, said intermediate panel housing having a lower edge and an upper edge, said first pivot being adjacent said rear edge of said base panel housing and said lower edge of said intermediate panel housing;

b) pivotally mounting a display panel housing from said intermediate panel housing at a second pivot, said display panel housing having a lower edge, said second pivot being adjacent said upper edge of said intermediate panel housing and said lower edge of said display panel housing said display panel being pivotable distally, relative to the viewer, back of the plane defined by said intermediate panel;

c) mounting said flat panel display on said display panel housing and functionally electrically interconnecting said flat panel display with selected ones of said plurality of electronic components; and d) pivoting said electronic device panels between a first folded closed configuration and at least a second, unfolded deployed configuration upon said support surface; said pivoting to said unfolded, deployed configuration including the steps of:

(i) supporting said base panel housing upon said support surface with the front edge proximate to the viewer;

(ii) pivotally rotating said intermediate panel housing above said base panel housing in a generally upwardly directed angle with respect to said support surface at an angle generally toward said viewer; and (iii) pivotally rotating said display panel housing from said intermediate panel housing to be directed at an angle with respect to said user wherein said flat panel display is viewable by said user in an elevated, ergonomically improved position, generally Z-shaped in side elevation.

* * * * *